(12) United States Patent
Edwards et al.

(10) Patent No.: US 9,938,850 B2
(45) Date of Patent: Apr. 10, 2018

(54) ELECTRICAL GENERATION ARRANGEMENT FOR AN AIRCRAFT

(71) Applicant: ROLLS-ROYCE PLC, London (GB)

(72) Inventors: Huw Llewelyn Edwards, Derby (GB); Robert William Slater, Derby (GB)

(73) Assignee: ROLLS-ROYCE plc, London (GB)

( * ) Notice: Subject to any disclaimer, the term of this patent is extended or adjusted under 35 U.S.C. 154(b) by 766 days.

(21) Appl. No.: 14/069,957

(22) Filed: Nov. 1, 2013

(65) Prior Publication Data

US 2014/0338352 A1 Nov. 20, 2014

(30) Foreign Application Priority Data

Nov. 6, 2012 (GB) .................... 1219916.2

(51) Int. Cl.
| | |
|---|---|
| *F01D 15/10* | (2006.01) |
| *F02C 3/10* | (2006.01) |
| *F02C 3/113* | (2006.01) |
| *F02C 7/32* | (2006.01) |

(52) U.S. Cl.
CPC ............ *F01D 15/10* (2013.01); *F02C 3/10* (2013.01); *F02C 3/113* (2013.01); *F02C 7/32* (2013.01); *F05D 2220/76* (2013.01); *Y02T 50/672* (2013.01)

(58) Field of Classification Search
CPC .... F01D 15/10; F02C 3/10; F02C 7/32; F02C 7/36; F05D 2220/76; F05D 2220/764; F05D 2220/7642; F05D 2260/4023; F05D 2270/06; F05D 2270/061; F05D 2270/304
USPC ....... 60/774, 39.091, 39.163, 792; 192/116.5
See application file for complete search history.

(56) References Cited

U.S. PATENT DOCUMENTS

| | | | | |
|---|---|---|---|---|
| 3,237,741 | A | * | 3/1966 | Gartner ............... F16D 9/06 123/198 R |
| 4,912,921 | A | * | 4/1990 | Rice ................. F02C 7/32 244/58 |
| 7,541,687 | B2 | * | 6/2009 | Stahlhut .............. H02P 9/00 290/40 C |
| 7,622,817 | B2 | | 11/2009 | El-Refaie et al. |
| 7,841,163 | B2 | | 11/2010 | Welch et al. |
| 7,973,422 | B2 | * | 7/2011 | Colin ............... F01D 15/10 290/52 |
| 2006/0272313 | A1 | | 12/2006 | Eick et al. |
| 2007/0151258 | A1 | | 7/2007 | Gaines et al. |

FOREIGN PATENT DOCUMENTS

| | | |
|---|---|---|
| EP | 1 936 150 A2 | 6/2008 |
| GB | 2 443 743 A | 5/2008 |

OTHER PUBLICATIONS

Mar. 6, 2013 Search Report issued in British Application No. GB 1219916.2.

* cited by examiner

*Primary Examiner* — Christopher Demeree
(74) *Attorney, Agent, or Firm* — Oliff PLC

(57) ABSTRACT

This invention relates to a multi-spool gas turbine engine, including: a first generator for providing electrical power to an electrical system, the generator being driveably connected to a first spool; a second generator for providing electrical power to the electrical system, the generator being driveably connected to a second spool; a disconnection device for disconnecting the second generator from the second spool; and, a controller configured to selectively operate the disconnection device under predetermined powered engine conditions.

18 Claims, 2 Drawing Sheets

ELECTRICAL GENERATION ARRANGEMENT FOR AN AIRCRAFT

TECHNICAL FIELD OF INVENTION

This invention relates to a gas turbine engine having a plurality of spools which are arranged to drive two or more electrical generators. In particular, this invention is concerned with an arrangement which includes at least one main generator and at least one auxiliary generator which is operable to provide an increased overall efficiency.

BACKGROUND OF INVENTION

Conventional gas turbines used for civil aircraft typically have two electrical generators associated with a spool of the engine. The favoured spool by many gas turbine manufacturers and air framers is the high pressure spool because the operating speed range is reduced compared to the lower pressure spools. The reduced speed range is preferable because the electrical frequency outputted by the generators is proportional to spool speed and a large frequency range can be problematic. Also, having a larger speed range generally results in larger, heavier electrical machines.

Some schemes are known in which the lower speed spools are used to provide rotational drives for electrical generators, but these all require some form of electronic control or complex and heavy gearbox arrangements to provide an acceptable electrical output over the broader speed range. Examples of such schemes are described in US20070151258, US2006272313, US2009051219 and U.S. Pat. No. 5,867,979.

The present invention seeks to provide a gas turbine engine with an improved electrical generating capability.

STATEMENTS OF INVENTION

In a first aspect, the present invention provides a multi-spool gas turbine engine, comprising: a first generator for providing electrical power to an electrical system, the generator being driveably connected to a first spool; a second generator for providing electrical power to the electrical system, the generator being driveably connected to a second spool; a disconnection device for disconnecting the second generator from the second spool; and, characterised by: a controller which is configured to selectively operate the disconnection device under predetermined powered engine conditions, the predetermined powered engine conditions corresponding to the rotational speed of the second spool or second generator.

Providing a disconnection device in this way allows for a more lightweight and efficient means of selectively taking power from the low pressure spool.

The first generator may be a main generator which provides the majority of electrical power for a given flight cycle. The first generator may be driveably connected the high pressure spool of a two spool engine or the high or intermediate spools of a three spool engine. The second generator may be an auxiliary generator which provides power under certain normal engine operating conditions where it is favourable to do so. For example, where there is a fuel saving to be had for the additional electrical input from the second generator. By normal it is meant that the engine is powered and the second generator is not solely for providing power in emergency flame-out/stall/windmill conditions. Thus, the controller is determined to detect or be provided with information which indicates that the engine is operable and under powered conditions.

The controller may be configured to determine the engine conditions from one or more of: a spool speed, a rate of change of spool speed, the engine pressure ratio, a rate of fuel consumption, a predetermined schedule of operation.

The engine may further comprise a sensing arrangement to sense the speed of rotation of the second spool or second generator. The controller may be configured to disconnect the second generator when the speed of rotation is above or below at least one predetermined threshold.

The controller may be configured to monitor the rate of change of speed in the spool or second generator. The speed or rate of change of speed of rotation may be sensed directly via a tachometer or a similar arrangement. Alternatively, or additionally, the speed of rotation may be taken indirectly. For example, the sensing arrangement may be arranged to sense the electrical output of the first or second generators.

The controller may be further configured to connect the disconnection device under windmill conditions or during engine start or relight The disconnection device may be a clutch.

The engine may further comprise a second disconnection device.

The second disconnection device may be an emergency shear. In one embodiment, this could be activated following a detected over speed in the electrical generator. In such an event, the generator may be configured to produce a torque sufficient to break the shear.

The first spool may be a high pressure spool, or intermediate pressure spool.

The second spool may be the low pressure spool, or intermediate pressure spool.

The engine may be a two spool engine. The engine may be a three spool engine. When the engine is the three spool engine, the first spool may be the intermediate pressure spool.

The second generator may be embedded within the engine core, core mounted, nacelle mounted, or located in the tail cone or embedded near the fan.

The first and second generators may be respectively configured in use to transfer power between shafts. In this configuration, the first or second generator may be controlled to act as a motor and receive power from the other of the first and second generator, thereby transferring power from one shaft to the other.

In a second aspect, the present invention relates to an aircraft which includes an engine of the first aspect, the aircraft may include energy storage which is electrically connectable to at least one of the first and second generators.

The aircraft may comprise at least one power electronic module which is configured to control the electrical condition of one or both of the first and second generators.

In a third aspect, the present invention provides a method of supplying electrical power from a multi-spool gas turbine engine having a first generator for providing electrical power to an electrical system, the generator being driveably connected to a first spool; a second generator for providing electrical power to the electrical system, the generator being driveably connected to a second spool; a disconnection device for disconnecting the second generator from the second spool; and, a controller configured to selectively operate the disconnection device under predetermined powered engine conditions, the method comprising the steps of: generating power with the first generator; generating power with the second generator; determining whether the engine is operating within predetermined powered operating conditions; and, characterised by: activating the disconnection mechanism when the engine is not operating within the predetermined powered engine conditions wherein the predetermined powered operating conditions correspond to a speed of rotation of the second spool or second generator.

Monitoring whether the engine operating within predetermined powered operating conditions may include monitoring one or more of: a spool speed, a rate of change of spool speed, the engine's overall pressure ratio, a rate of fuel consumption and a predetermined schedule of operation.

DESCRIPTION OF DRAWINGS

Embodiments of the invention will now be described with the aid of the following drawings of which.

DETAILED DESCRIPTION OF INVENTION

Figure 1:
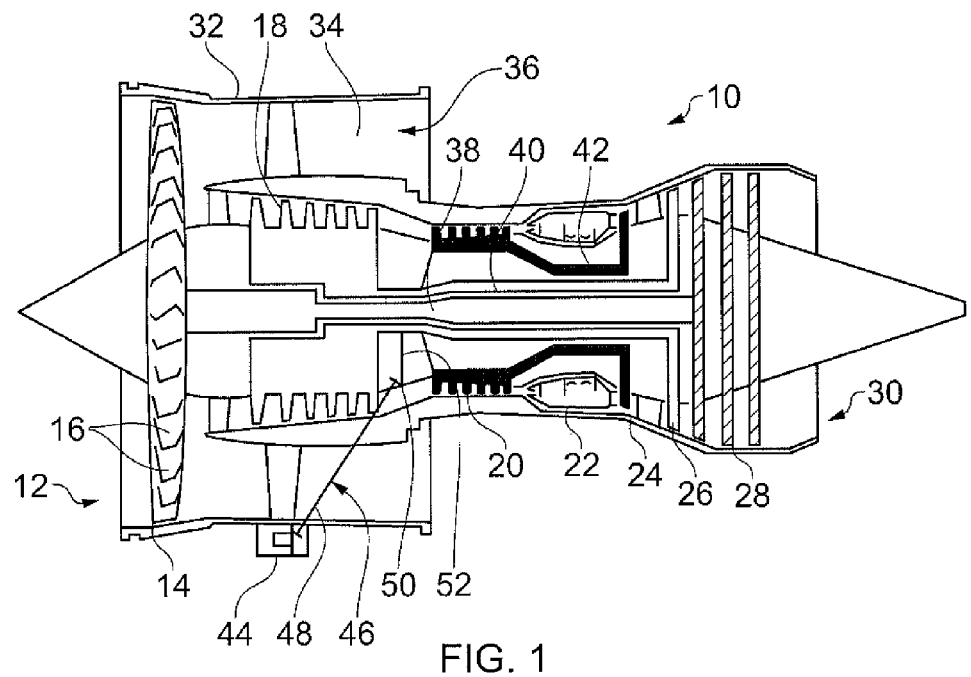
FIG. 1 shows a schematic of a conventional gas turbine engine.

FIG. 1 shows a conventional ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

In current gas turbine engines, electrical power is typically generated by a wound field synchronous generator 44, which provides variable frequency power to the aircraft, although it will be appreciated that other electrical machines could be used subject to reliability and electrical performance requirements. The generator 44 is driven via a mechanical drive train 46 which includes an angle drive shaft 48, a step aside gearbox 50 and a radial drive 52 which is coupled to the intermediate pressure spool shaft 40 via a geared arrangement. Thus, the rotational speed of the generator's rotor and the electrical frequency which is outputted into the electrical system of the aircraft is proportional to the speed of the engine. It will be appreciated that other transmission arrangements are possible and these may enable a core mounted electrical machine for example, or an integrated constant speed drive to give constant frequency power.

Generally, the weight of an electrical machine increases as the speed range over which it is required to produce a constant power increases. This is because, to a first approximation, the size and weight of an electrical machine is proportional to the maximum torque it must generate, which, for a given constant power requirement, increases as the minimum speed reduces. Typically, gas turbine aircraft engines provide electrical power to the aircraft by extracting electrical power from one of the shafts, typically the intermediate pressure shaft or high pressure shaft for a three spool engine or the high pressure shaft on a two spool engine. This is because the intermediate and high pressure shafts generally have a smaller speed range which means that the range of electrical frequency is smaller, which is more easily managed for on board equipment etc, and the mechanical loads are less onerous to account for.

Figure 2:
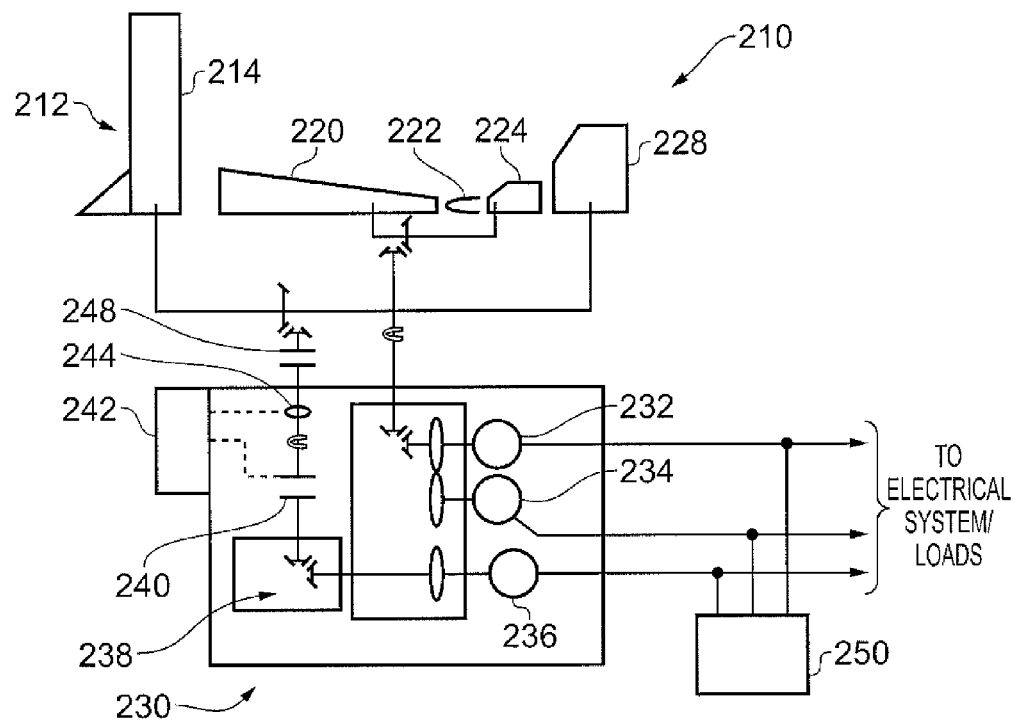
FIG. 2 shows a schematic representation of a gas turbine engine according to the invention.

FIG. 2 shows a schematic representation of a gas turbine engine 210, similar to the one shown in FIG. 1, with the significant difference that it is a two spool engine, rather than three spool. By spool it will be appreciated that this is a collective term for a compressor, shaft and turbine combination. Thus, there is shown a ducted fan gas turbine engine 210 comprising, in axial flow series: an air intake 212, a propulsive fan 214, a high-pressure compressor 220, a combustor 222, a high-pressure turbine 224, and a low-pressure turbine 228 for driving the fan.

On the outside of the core (or nacelle (not shown)), there are mounted a number of accessories including the electrical generation system 230 of the invention. The electrical generation system 230 includes a first 232 and a second 234 main generator which are operational during the flight cycle of an associated aircraft, and an auxiliary generator 236 which is selectively operational. The electrical generation system supplies electrical power to an electrical system (not shown) which includes various electrical loads on the aircraft and engines.

The main generators 232, 234 are driveably connected to the high pressure spool via a transmission which includes various gears and shafts, as known in the art and similar to that described above in relation to FIG. 1. The auxiliary generator 236 is driveably connected to the low pressure spool via a transmission 238 which includes various shafts and gears and a disconnection device 240 in the form of a clutch.

The clutch 240 can be any suitable type as is known in the art and may be one taken from the group including: a plate clutch having two separate plates made from a carbon or composite material; a fluidic clutch in which fluid is drawn out of the clutch to disengage, a magnetic gear, such as that disclosed in US2011253498 which is hereby incorporated by reference; an electromagnetic clutch; a centrifugal decoupling device in which connection is made by a series of blocks that move outwards as the speed increases so as to disconnect the two shaft members as described in, for example, US20110198182; or a magneto-rheological fluid clutch. A magneto-rheological clutch is one in which has a suspension of magnetic particles in a carrier fluid which transitions into a semi-solid state under the application of a suitable magnetic field. Such a coupling is advantageous because the field strength of the controlling magnetic field can be used to change yield stress in the rheological fluid to enable it as a disconnection device or as a protection device which shears with sudden peak loads. It will be appreciated that the above described examples of clutches and any other disconnection mechanisms will need to the suitable mechanical properties for a given application.

Generally, the present invention involves using an electrical machine for a specific part of a gas turbine's speed range where the extraction of power from one of the lower pressure spools offers the most benefit to enabling improved operability of the gas turbine, for example, reduced compressor bleed. Thus, the controller 242 is configured to determine the operating condition of the engine and determine whether it is within a predetermined range as defined by at least one threshold. The threshold may correspond to a number of factors which determine when it is desirable to have the auxiliary generator 236 connected and providing electrical power, or disconnected. These factors may include a safe operating limit for the upper and lower speeds of the auxiliary generator, a required electrical output frequency, the amount of power required by the system and the amount of fuel being burnt by the gas turbine engine. Engine speeds or other conditions such as predetermined times in a flight cycle may also provide an indication as to when it may be desirable to transfer power from one shaft to another by using one of the generators as a generator, and the other as a motor. It will be appreciated that some form of power electronics may be required to enable this, depending on the application and the type of electrical machine which is being used. Further, it may be desirable to have numerous thresholds or ranges to allow the auxiliary generator to perform different functions.

In order to realise the goals described above, the arrangement includes a controller 242 which is operable to sense at least one condition in the engine 210 during normal or powered conditions and, from the sensed condition, determine whether the auxiliary generator should be connected. In one embodiment, the controller calculates the speed of the low pressure spool or rotor of the auxiliary machine (when connected) and assesses whether it falls below a predefined threshold, for example, an upper speed threshold. By normal or powered conditions, it is meant that the controller 242 is primarily concerned with assessing the engine condition in non-emergency situations, that is, when there is no flame-out or windmill conditions or the like, and the engine is performing within expected or acceptable tolerances within a flight cycle.

Thus, In the described embodiment, the controller 242 receives a signal from an encoder 244 mounted to a suitable part of the mechanical transmission (as shown) which outputs a signal which is proportional to the rotational speed of transmission and low pressure spool. Other methods could be used to detect the speed of the spool such as monitoring the electrical frequency of main generator or auxiliary generator (when connected) or directly monitoring the speed of the gas turbine etc, which are conventionally used for other monitoring and control purposes in state of the art gas turbine engines.

Although the invention is typically concerned providing power at the lower engine speeds, it is possible that some benefit may be had in some embodiments to set the predetermined range or thresholds in relation to a mid-range of the engine speed. For example, a turbine spool speed may be in the range of 1000 to 3000 rpm, but the auxiliary generator could be designed to only operate in the speed range of 1500 to 2000 rpm.

The controller 242 is communicably connected to the disconnection device 240 such that it can issue a control signal to the disconnection device 240 which results in the disconnection or connection of the generator 236 as required on the basis of the measured speed.

The controller 242 may be configured to assess other parameters in addition, or as an alternative, to the rotational speed of the transmission or generator rotor. These may include a rate of change of speed, fuel consumption or a predetermined schedule of operation. The schedule of operation may include details of altitude, speed or thrust which may require predetermined assumptions about the speed of the engine or the electrical power requirements.

The rate of change of speed is a particularly advantageous parameter to monitor as it allows the controller to account for any delays in the operation of the disconnection device. Hence, the controller may be configured to take account of the maximum rate of change of speed of the shaft which drives the generator rotor and initiate disconnection in time to prevent an over-speed on the electrical machine and its drive equipment. The maximum speed could be an absolute maximum rate of change or a predicted maximum speed based on the engines current operating state, for example.

The arrangement also includes a secondary disconnection mechanism 248. The secondary disconnection mechanism 248 is placed in axial series with the first, or primary, disconnection mechanism described above such that either can disconnect the transmission between the engine spool and auxiliary electrical generator 236. The secondary disconnection mechanism 248 is operable under a different set of conditions and may be passive so as to disconnect under a given set of undesirable circumstances, such as an over torque in the shaft, or actively controlled so as to provide some redundancy. Thus, the secondary mechanism 248 may be a clutch arrangement as described above, or a shear portion which is calibrated to shear during an over-torque or the like.

In one embodiment, the secondary disconnection mechanism is activated following a detected over speed in the electrical generator. In such an event, the generator may be configured to produce a torque sufficient to break the shear. In the case of a conventional wound field machine, the control for achieving the over torque may be achieved via the generator control unit, through an increase in field winding current and/or through an addition of electrical loads.

In some embodiments, power electronic devices (not shown) are included in the overall system to receive and condition the electrical power outputted by one or more of the electrical generators for the electrical loads of the aircraft. The conditioning could include adjusting the frequency to be at a fixed value, such as DC or a given AC value, or within a specified range, e.g. between 400 Hz and 800 Hz. Alternatively, power electronics could be used to aid operation or connection of the respective electrical machines. It will be appreciated that some applications may include electrical loads that can accept variable frequency power.

Power electronics will be understood to include: back to back converters, matrix converters, cyclo-converters, multi-layer converters and multi-pulse converters, typically 6 or 12 pulse, and may include transformer units to enable higher pulse or voltage conversion and filtering to maintain power quality. It will be appreciated that there may be other methods of converting and controlling electrical power frequency, voltage and current which could be applied to the invention.

Controlling the connection of the auxiliary generator 236 at reducing engine speeds is less sensitive as the electrical machine can be motored to bring it up to speed before being brought on line as described in more detail below. Further, the required electrical power will already be provided by the main generator when the speed of the engine is reducing and bleed valves can be used to maintain a higher engine speed at a reduced thrust, if required. Nevertheless, power electronics could also advantageously be used to manage the transfer of power from the main generators 232, 234 to the auxiliary generator 236 and prevent or reduce sudden changes in load on each spool which is generally to be avoided to help maintain stability in the gas turbine engine 210. The power electronics can also be configured to enable a higher quality of power during the transfer period than if trying to transfer power via hard switched contactors. That is, using power electronics to enable a make before break power transfer by frequency matching the outputs of the two generators during a brief period of paralleling power output before one generator is electrically disconnected. However, in other embodiments, soft switch contactors, or break before make methods (described below) using discrete solid state switches may be used in place of power electronic devices if the requirements of the power quality could be sufficiently managed within expected parameters.

The power electronic devices could incorporate silicon, silicon carbide or galium nitride technologies but are not limited to these.

Energy storage 250 is included in the system 230 of the described embodiment. The energy storage 250 is connected to the electrical network and main and auxiliary generators so as to be chargeable and dischargeable as required. The energy storage 250 may be used to stabilise the power supply which is provided to the network by reacting to transients in the supplied power either by removing or providing excess power as required. Alternatively or additionally, the energy storage 250 may be used as a part of a "break before make" scheme in which power is provided to the network from the energy storage whilst the disconnection device removes the drive to the auxiliary generator.

The energy storage may be DC or AC and connected to the electrical system in a corresponding and appropriate way. Thus, for example a DC energy storage system, the energy storage could be connected to a DC part of the network, ideally a higher voltage portion of the DC system or connected to a DC link in an AC to AC converter. Alternatively, for an AC system, a DC energy store could be connected via a dedicated DC to AC converter or a convertor which is otherwise redundant during normal use. Such a convertor may be that of the engine starting system. In one embodiment, an AC energy storage solution includes a flywheel connected to an electrical generator. Here the rotational speed of the flywheel would be controlled to be closely matched to the AC frequency of the system so as to maintain the rotation of the generator when the mechanical drive is removed.

In other embodiments, the energy storage 250 or power from the main network could provide power to motor the auxiliary generator (via additional or unused power electronics) so as to bring it up to speed before being connected to the respective engine spool, thereby preventing or helping to reduce any mechanical shock and allowing the disconnection device to be of a lower rating.

The energy storage can be one or more taken from the group including: electrostatic capacitors, magnetic storage devices, thermal storage, pneumatic storage, kinetic storage devices such as the flywheel described above and a hydraulic storage.

It will be noted that providing energy storage 250 may be more advantageous on a DC system where there is no zero crossing and thus the loads to be switched are more significant. The energy storage may be placed with the existing DC loads that are likely to be found on the aircraft and which are selected to be transferred to the auxiliary generator during use.

The disconnection controller may be a part of a larger control system which selects when to activate a transfer of power from one generator to another in response to a perceived net benefit for fuel consumption. The auxiliary generator 236 may also be used as an emergency system to provide power if one or more of the main generators 232, 234 fails, thereby providing additional redundancy. The auxiliary generator 236 could also be driven by the fan 214 operating as a windmill in the event of an engine failure which is conventionally achieved with a ram air turbine or an auxiliary power unit which is separate from the propulsive gas turbine engines.

The controller 242 may also be configured to connect the auxiliary generator 236 to provide steady state benefits to the engine 210 or to help accommodate periods of transient behaviour. For example, the auxiliary generator 236 may be connected during descent periods to provide a steady state benefit in which the high pressure off take is reduced and the intermediate pressure or low pressure power off take increased which allows the engine speed to be reduced. This allows a reduction in handling bleed and a resultant fuel saving. For transients, the auxiliary generator 236 may be brought into service for a few seconds or minutes when required to help improve surge margin, particularly during periods of lower power output for the engine. For example, if the auxiliary generator is connected to its respective spool, it could be configured to take any transient loading in preference to the main generators, reducing the impact of transients.

Figure 3:
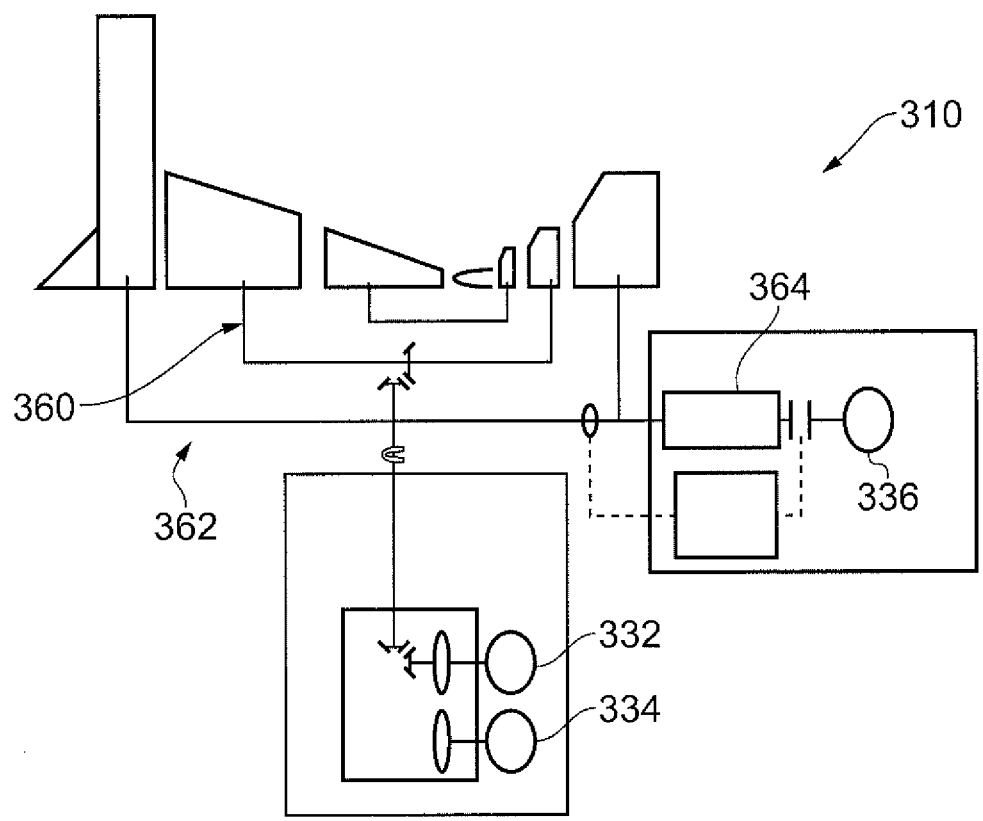
FIG. 3 shows an alternative embodiment of the gas turbine engine according to the invention.
Figure 4:
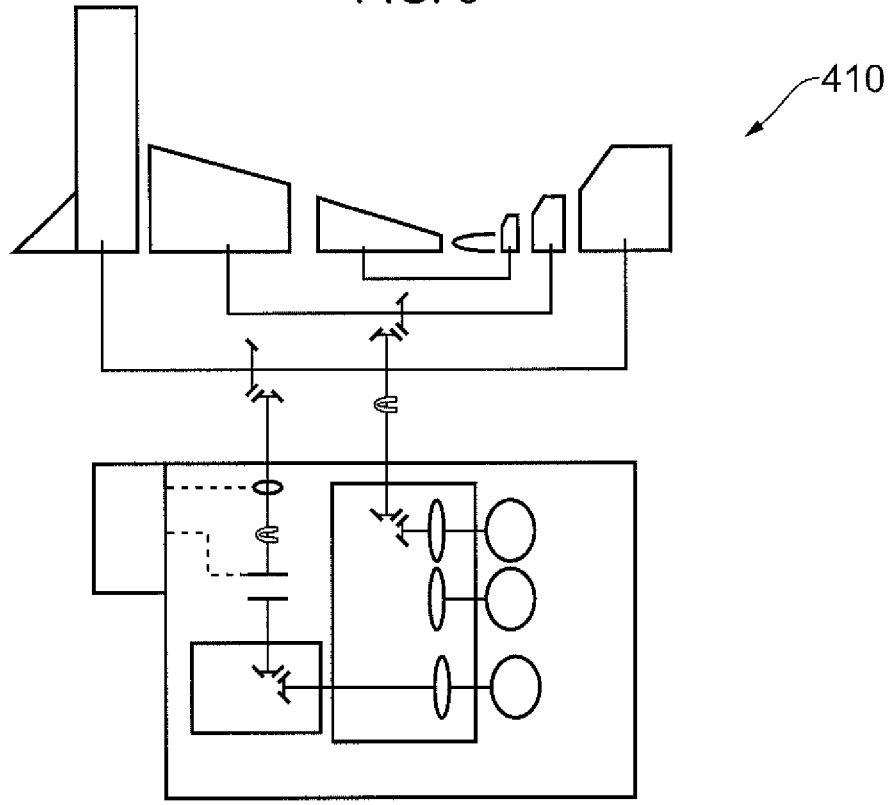
FIG. 4 shows a yet further embodiment of a gas turbine engine according to the invention.

FIG. 3 shows an alternative arrangement in which the gas turbine engine 310 is a three spool engine rather than the two spool as shown in FIG. 2. Here, the main generators 332, 334 are driven by the intermediate spool 360, and the auxiliary generator 336 is selectively driven by the low pressure spool 362 via a gearbox 364 and is inline with the low pressure shaft. For example, the low pressure generator may be embedded in the engine core or tail cone. The arrangement is similar to that described in FIG. 2 in other aspects. FIG. 4 shows a three spool gas turbine engine 410 similar to that of the two spool arrangement shown in FIG. 2.

In relation to FIG. 2, when the gas turbine engine 210 is in a flight cycle in use, the main electrical generators 232, 234 are rotatably driven by the engine 210 and electrical power is provided to the electrical loads as required. The controller 242 is set to monitor the rotational speed of the low pressure spool via the auxiliary generator transmission to ascertain whether the speed is in the predetermined range as defined by one or more thresholds. When the speed drops below a predetermined threshold the controller begins the connection procedure to connect the disconnection device and bring the auxiliary generator 236 on line.

In one embodiment, the connection procedure begins by the controller issuing a signal to the energy storage and associated switch gear to provide electrical energy to the auxiliary generator such that it can be operated as a motor and bring the rotor up to speed. Alternatively, power can be drawn from one of the main AC or DC buses via a suitably controlled switching arrangement. Once at speed, the power supply from the energy storage or main AC or DC network buses can be disconnected, the disconnection device 240 actuated and the auxiliary generator 236 driveably connected to the low pressure spool. This increases the electrical power supplied from the auxiliary generator and the loading on the low pressure spool. A "no break power transfer" method, as known from conventional emergency switching of an Auxiliary Power Unit (APU), is then used where the auxiliary generator is electrically connected to the same loads as the main generator by closing a contactor. This switching may be achieved using power electronics to enable frequency matching. The two generators then provide power to the network in parallel for a short period and the main generator is electrical disconnected by opening the appropriate contactor. In other embodiments, the main generator is disconnected with power being supplied to the electrical loads from the energy storage system prior to the connection of the auxiliary generator in a "break before make" arrangement.

The controller 242 can also be arranged to continually monitor the speed of the low pressure spool to determine when the engine speed increases again to above the predetermined threshold which indicates when the auxiliary generator should be disconnected. When this occurs, the disconnection device is operated and the auxiliary generator disconnected. The disconnection may be aided by providing power from the energy storage device 250 to the loads before actuating the disconnection device 240 thereby helping to avoid a sudden change in the low pressure spool loading, as described above.

It will be appreciated that the spool speeds at which the invention may be implemented will be application specific. The type of the electrical machine, the design of the gas turbines and the power requirements are all variables for consideration. There will also be a dependency on the power which is desirable to be taken from the low pressure spool. In one embodiment, the disconnection device is designed to operate at the lower range of the low pressure spool speed, for example, between 400-1000 rpm (shaft speed) of a possible 400-2500 rpm. It will be appreciated that the rotor speed of the electrical machine will be higher than this due to the geared transmission and may have a corresponding operating speed of between 10000-25000 rpm or greater. In other words, it can be advantageous for the predetermined threshold for engaging the auxiliary generator to be within the range or 30% to 50% of the low pressure spool speed. A lower threshold can be intrinsically set at the bottom of the low pressure spool operating speed, or a range between 5% and 45% of the low pressure spool speed range.

It will be appreciated that the above description is not limiting and the scope of the invention is defined by the claims and other features may be included in an overall system which falls within the broad inventive concept. For example, the system may include an additional containment system for the low speed generator, as are generally known in other areas of aerospace art, such as fan blade containment. Additionally or alternatively, the electrical machines which may break up under over speed conditions may be arranged to be retained within a housing of the machine, or may include designed fault lines which encourage the machine to break up in a controlled manner.

The invention claimed is:
1. A multi-spool gas turbine engine, comprising:
   a first generator for providing electrical power to an electrical system, the first generator being driveably connected to a first spool;
   a second generator for providing electrical power to the electrical system, the second generator being driveably connected to a second spool;
   a disconnection device configured to disconnect the second generator from the second spool wherein the second generator is also not connected to the first spool, and,
   comprising:
   a controller which is configured to selectively operate the disconnection device under predetermined powered engine conditions while the engine is running, the predetermined powered engine conditions corresponding to a rotational speed of the second spool or second generator.

2. An engine as claimed in claim 1, wherein the controller is configured to determine the speed of rotation of the second spool or second generator from one or more of: a spool speed, a rate of change of spool speed, a rate of fuel consumption, the overall engine pressure ratio, a predetermined schedule of operation.

3. An engine as claimed in claim 1, further comprising a sensing arrangement to sense the speed of rotation of the second spool or second generator, wherein the controller is configured to disconnect the second generator when the speed of rotation is above at least one predetermined threshold.

4. An aircraft according to claim 3, wherein the predetermined threshold for the speed of rotation is in a range of 1000 to 3000 rpm.

5. An aircraft according to claim 3, wherein the predetermined threshold for the speed of rotation is in a range of 400-1000 rpm.

6. An engine as claimed in claim 1 wherein the controller is configured to monitor the rate of change of speed in the spool or rotor of the second generator.

7. An engine as claimed in claim 1 wherein the controller is further configured to connect the disconnection device under windmill conditions or to start the engine.

8. An engine as claimed in claim 1 wherein the disconnection device is a clutch.

9. An engine as claimed in claim 1 further comprising a second disconnection device.

10. An engine as claimed in claim 1 wherein the second disconnection device is an emergency shear.

11. An engine as claimed in claim 1 wherein either or both of the first and second generator are arranged to transfer power between the first and second spools during use.

12. An engine as claimed in claim 1 wherein the second spool is the low pressure spool or intermediate pressure spool.

13. An engine as claimed in claim 1 wherein the second generator is embedded within a core of the engine.

14. An aircraft having an engine as claimed in claim 1 wherein the aircraft includes energy storage which is electrically connectable to at least one of the first and second generators.

15. An aircraft as claimed in claim 1, comprising at least one power electronic module which is configured to control the electrical output of one or both of the first and second generators.

16. An engine as claimed in claim 1, further comprising a sensing arrangement to sense the speed of rotation of the second spool or second generator, wherein the controller is configured to disconnect the second generator when the speed of rotation is below at least one predetermined threshold.

17. A method of supplying electrical power from a multi-spool gas turbine engine having a first generator for providing electrical power to an electrical system, the first generator being driveably connected to a first spool; a second generator for providing electrical power to the electrical system, the second generator being driveably connected to a second spool; a disconnection device configured to disconnect the second generator from the second spool wherein the second generator is also not connected to the first spool; and, a controller configured to selectively operate the disconnection device under predetermined powered engine conditions while the engine is running, the method comprising the steps of:

generating power with the first generator;
   generating power with the second generator;
   determining whether the engine is operating within predetermined powered operating conditions; and
   activating the disconnection mechanism when the engine is not operating within the predetermined powered engine conditions,
   wherein the predetermined powered operating conditions correspond to a speed of rotation of the second spool or second generator.

18. A method as claimed in claim 17, wherein determining whether the engine is operating within predetermined powered operating conditions includes monitoring one or more of: a spool speed, a rate of change of spool speed, a rate of fuel consumption and a predetermined schedule of operation.

* * * * *